United States Patent [19]
Biscomb

[11] Patent Number: 4,730,119
[45] Date of Patent: Mar. 8, 1988

[54] SAIL-DRIVEN WIND MOTOR

[76] Inventor: Lloyd I. Biscomb, 4452 Burlington Pl., N.W., Washington, D.C. 20016

[21] Appl. No.: 911,095

[22] Filed: Sep. 24, 1986

[51] Int. Cl.$^4$ .......................... H02P 9/04; F03B 13/00
[52] U.S. Cl. ......................................... 290/55; 290/54; 290/44; 290/43; 290/42; 416/132 B; 416/DIG. 6; 416/117; 416/119; 415/2 R; 415/3
[58] Field of Search ...................... 290/55, 54, 44, 43, 290/42; 416/132 B, DIG. 6, 240 A, 117, 119; 415/2, 3

[56] References Cited

U.S. PATENT DOCUMENTS

| | | | |
|---|---|---|---|
| 665,810 | 1/1901 | Stretch | 290/55 |
| 827,889 | 8/1906 | Smith | 416/80 |
| 830,973 | 9/1906 | DeCamp | 60/398 |
| 984,266 | 2/1911 | Doney | 60/721 |
| 1,000,351 | 8/1911 | Symons et al. | 416/68 |
| 2,465,285 | 3/1949 | Schwickerath | 416/41 |
| 2,554,381 | 5/1951 | Patterson, Jr. | 60/398 X |
| 3,986,786 | 10/1976 | Sellman | 415/2 R |
| 3,987,987 | 10/1976 | Payne et al. | 290/55 X |
| 3,995,170 | 11/1976 | Graybill | 290/55 |
| 3,995,972 | 12/1976 | Nassar | 415/2 X |
| 4,019,828 | 4/1977 | Bunzer | 290/55 X |
| 4,024,409 | 5/1977 | Payne | 290/55 |
| 4,130,380 | 12/1978 | Kaiser | 416/132 B X |
| 4,316,361 | 2/1982 | Hoar | 290/55 X |
| 4,329,593 | 5/1982 | Willmouth | 290/55 X |
| 4,353,702 | 10/1982 | Nagy | 416/240 A |
| 4,371,346 | 2/1983 | Vidal | 416/132 B |
| 4,388,041 | 6/1983 | Dorr | 416/119 |
| 4,406,584 | 9/1983 | Stepp | 416/119 X |
| 4,419,587 | 12/1983 | Benton | 290/55 X |
| 4,470,770 | 9/1984 | Grose | 417/334 |
| 4,476,397 | 10/1984 | Lawson | 290/43 X |
| 4,525,124 | 6/1985 | Watson et al. | 416/132 B |
| 4,527,950 | 7/1985 | Biscomb | 416/132 B X |
| 4,530,642 | 7/1985 | Yang | 416/132 B X |
| 4,566,853 | 1/1986 | Likitanupak | 416/119 X |

Primary Examiner—William M. Shoop, Jr.
Assistant Examiner—Sharon D. Logan
Attorney, Agent, or Firm—Cushman, Darby & Cushman

[57] ABSTRACT

A sail-driven wind motor (SDWM) is described, in which a reciprocating load amenable to intermittent, bidirectional drive (such as a water pump or air compressor) is driven by one or two arms, with each arm driven by at least one conventional fore-and-aft rigged sail. Masts for the sails are mounted on beams which are pivotally mounted on the arms. At least one mast and sail per beam, and at least one beam per arm are required to drive the load. Mechanisms are described for controlling the sails to drive the load, and to stop operation of the SDWM during excessive wind velocity. SDWMs for three types of sites are described: land, shallow water, and deep water. Each arm is supported by at least one cross-arm, which rides on wheels for a land site, or on at least one double-ended float for water sites. For all three types of sites, the sail drag must be transferred to the ground, while the sail lift must be transferred to the load via the arm. A mechanism is described for transferring the sail drag to the ground.

13 Claims, 24 Drawing Figures

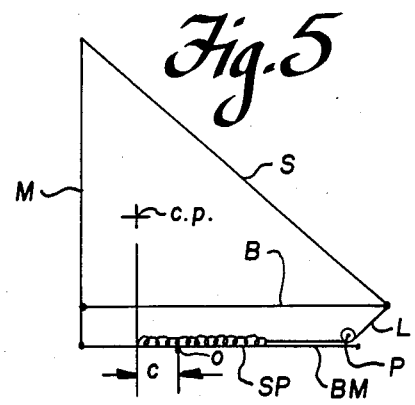
Fig. 5
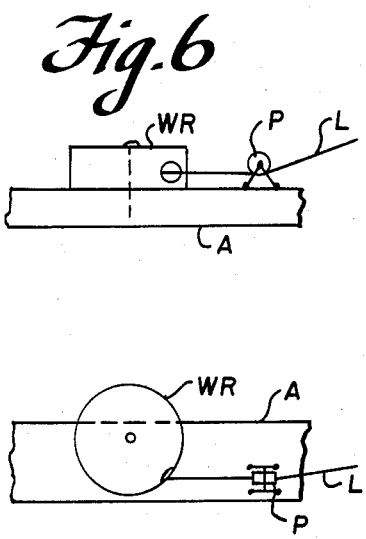
Fig. 6
Fig. 7
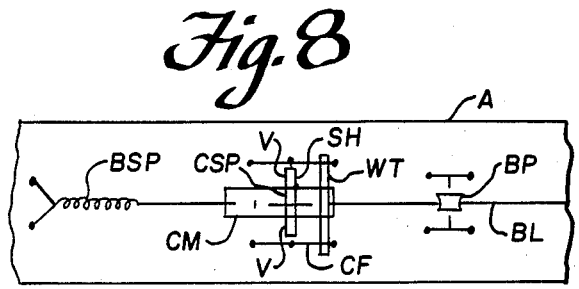
Fig. 8
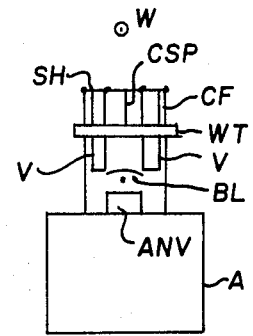
Fig. 10
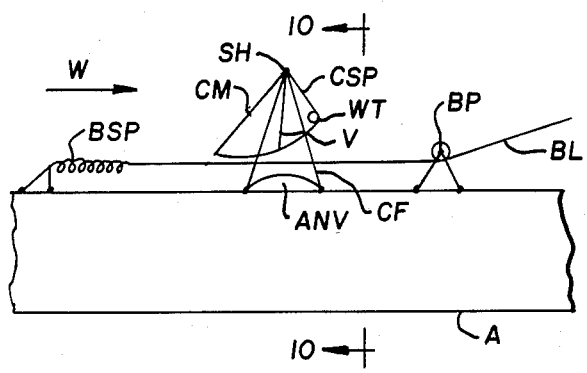
Fig. 9

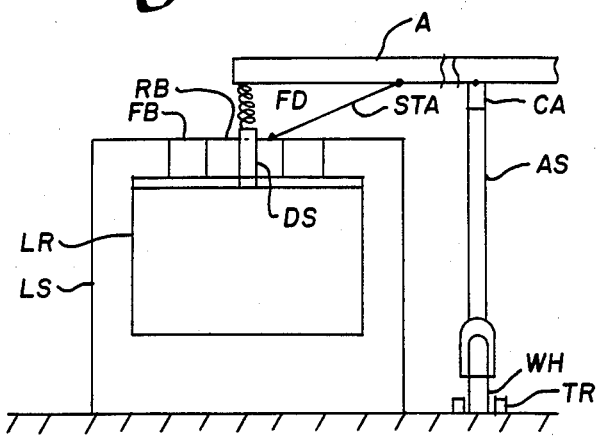
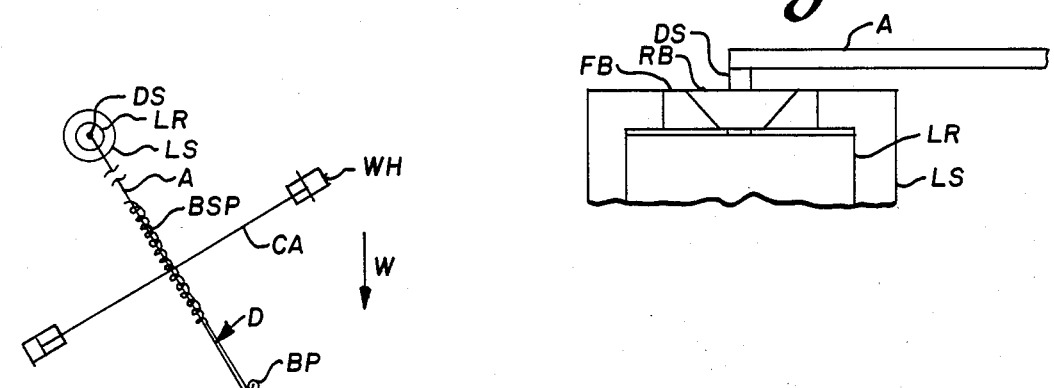
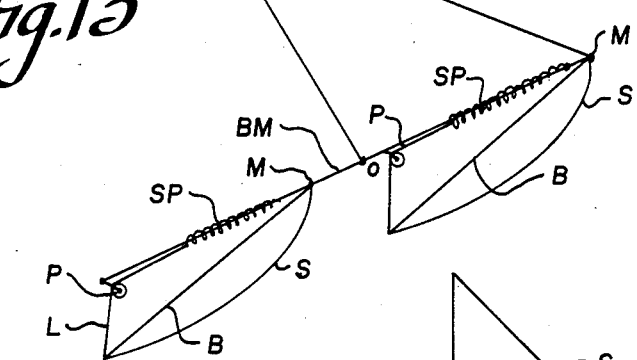
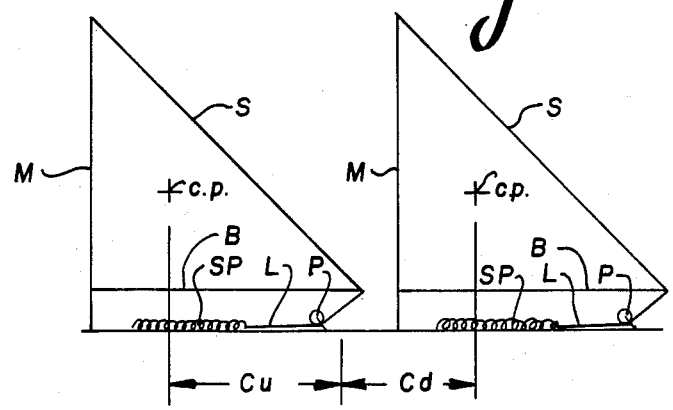
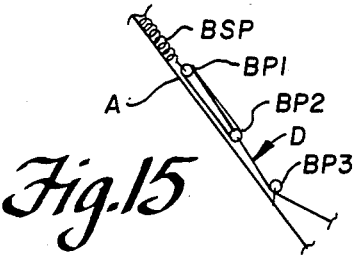

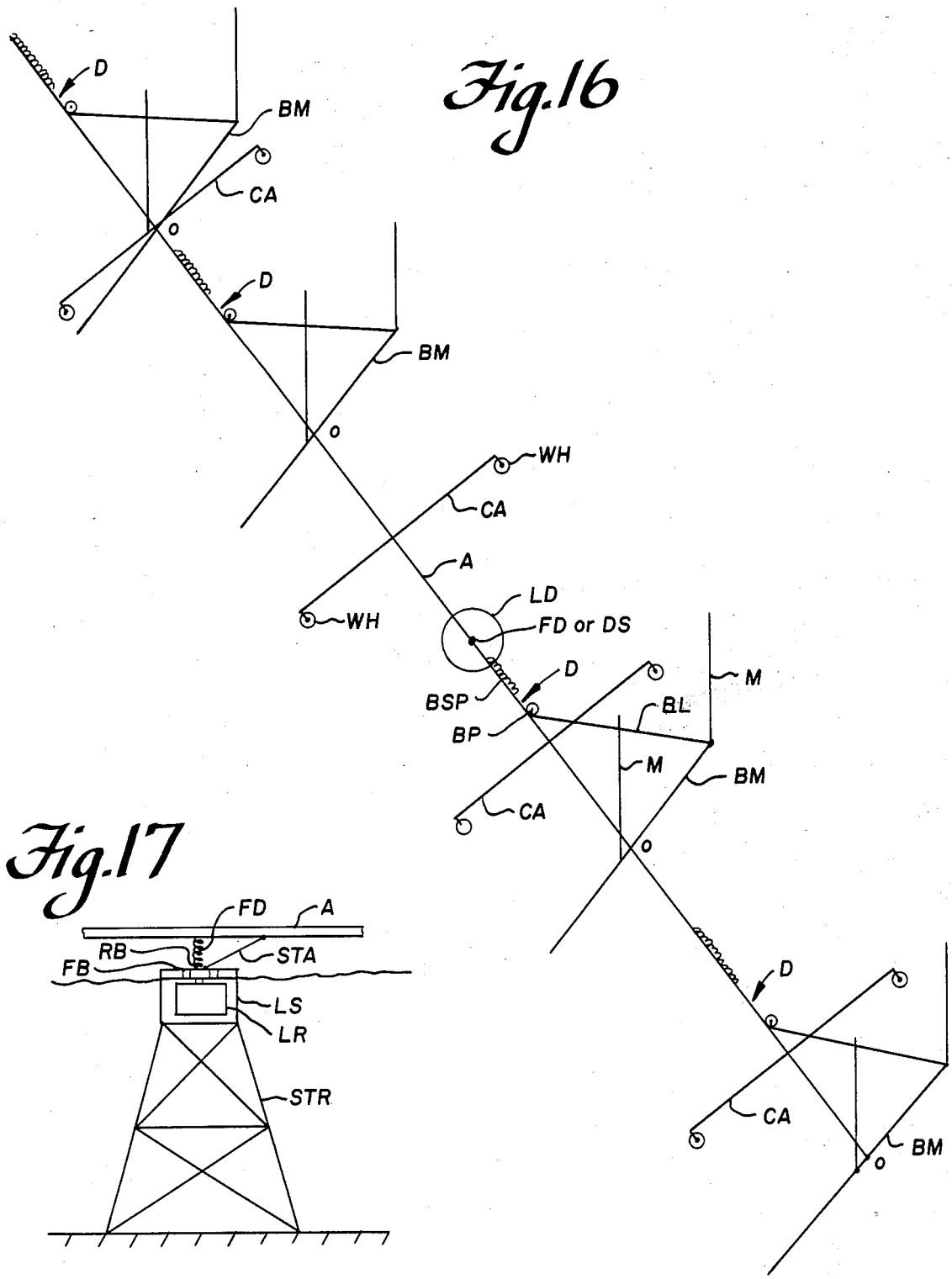

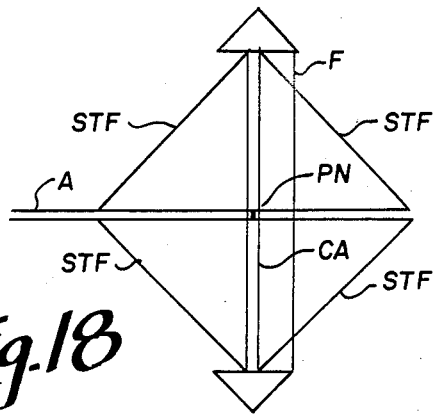
Fig. 18
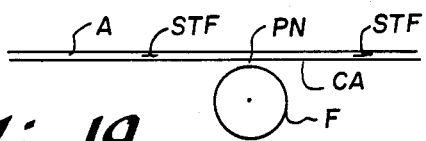
Fig. 19
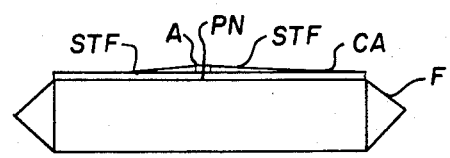
Fig. 20
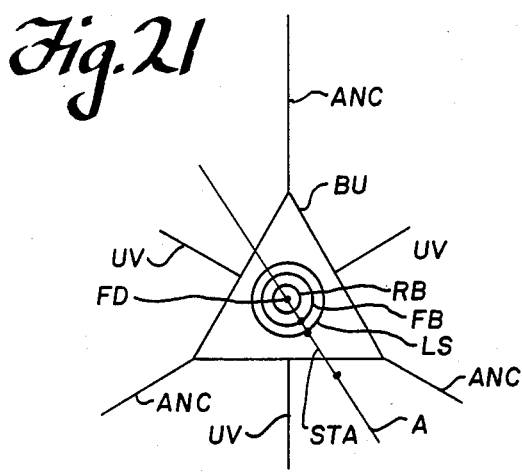
Fig. 21
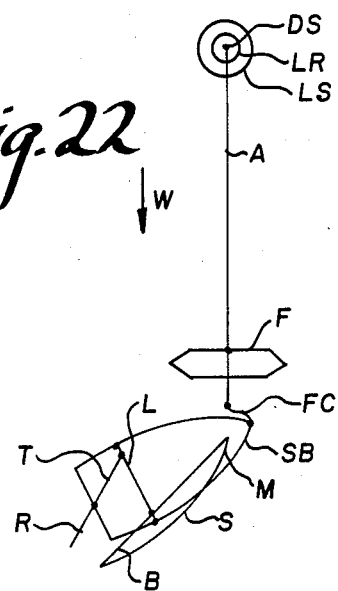
Fig. 22
Fig. 23
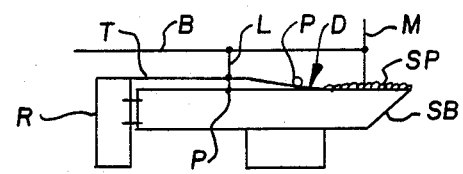
Fig. 24

SAIL-DRIVEN WIND MOTOR

BACKGROUND OF THE INVENTION

This invention relates to an oscillating-arm wind motor which is caused to oscillate by action of the wind on one or more sails connected to the arm.

SUMMARY OF THE INVENTION

A sail-driven wind motor (SDWM) is described, in which a reciprocating load amenable to intermittent, bidirectional drive (such as a water pump or air compressor) is driven by one or two arms, with each arm driven by at least one conventional fore-and-aft rigged sail. Masts for the sails are mounted on beams which are pivotally mounted on the arms. At least one mast and sail per beam, and at least one beam per arm are required to drive the load. Mechanisms are described for controlling the sails to drive the load, and to stop operation of the SDWM during excessive wind velocity. SDWMs for three types of sites are described: land, shallow water, and deep water. Each arm is supported by at least one cross-arm, which rides on wheels for a land site, or on at least one double-ended float for water sites. For all three types of sites, the sail drag must be transferred to the ground, while the sail lift must be transferred to the load via the arm. A mechanism is described for transferring the sail drag to the ground.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the Drawings

FIG. 5 is a fragmentary schematic side elevational view showing the sail and mast and connections thereof with the beam;

FIG. 6 is a fragmentary, enlarged scale schematic side elevational view of a modification of a portion of the sructure shown in FIG. 1, in which spring-driven wind-up reels replace coil springs;

FIG. 7 is a fragmentary schematic top plan view of the modification which is illustrated in FIG. 6;

FIG. 8 is a fragmentary, enlarged scale schematic top plan view of the arm of the sail-driven wind motor, showing a control mechanism for curtailing operation of the sail-driven wind motor during periods of high wind;

FIG. 9 is a fragmentary schematic side elevational view thereof;

FIG. 10 is a transverse cross-sectional view thereof on line 10—10 of FIG. 9;

FIG. 11 is a fragmentary schematic enlarged scale side elevational view of the hub region of the sail-driven wind motor of FIG. 1, showing a mechanism for transferring sail drag to the ground;

FIG. 12 is a fragmentary schematic enlarged scale side elevational view similar to FIG. 11, of a modification useful for a land-based sail-driven wind motor;

FIG. 13 is a schematic top plan view, similar to FIG. 1, but of a single-ended sail-driven wind motor having its one cross-arm associated with a beam having two masts and sails;

FIG. 14 is a fragmentary schematic side elevational view, similar to FIG. 5, but of the modification shown in FIG. 13;

FIG. 15 is a fragmentary schematic top plan view of the arm of the structure shown in FIG. 13, showing a rigging modification applicable not only to the embodiment of FIG. 13, but to the other embodiments as well;

FIG. 16 is a schematic top plan view, similar to FIG. 1, but of a double-ended sail-driven wind motor provided with two cross-arms per arm and two masts (and sails) per beam;

FIG. 17 is a fragmentary schematic side elevation view of the hub region of a modification for adapting the sail driven motors of FIGS. 1-16 to be used at a shallow-water site;

FIG. 18 is a fragmentary schematic top plan view of an arm of the modified device of FIG. 17, showing how the arm may be supported on a double-ended float, rather than on the wheels used for the land-based versions of FIGS. 1-16;

FIG. 19 is a fragmentary schematic side elevational view of the structure shown in FIG. 18;

FIG. 20 is a fragmentary schematic transverse cross-sectional view of the structure shown in FIG. 19;

FIG. 21 is a fragmentary schematic top plan view of the hub region of a modification for adapting the sail-driven wind motors of FIGS. 1-16 to be used at a deep water site;

FIG. 22 is a schematic top plan view of a sail-driven wind motor similar to the one shown in FIG. 1, as modified for use on water as disclosed with reference to FIGS. 17-21, but in which the beam-mounted mast and sail has been replaced by a tillered rudder-equipped, fore and aft-rigged sail boat flexibly connected at the bow to the outer end of the arm;

FIG. 23 is a schematic perspective view of the sail boat of FIG. 22, in which the line connecting the boom with the tiller is made endless by being extended about pulleys mounted at transverse extremes intermediate the length of the hull; and FIG. 24 is a schematic side elevational view of the sail boat of FIG. 22, modified so as to include an operation-curtailing mechanism for this embodiment, similar to the one shown in FIG. 8.

DETAILED DESCRIPTION OF PRESENTLY PREFERRED EMBODIMENTS

Figure 1:
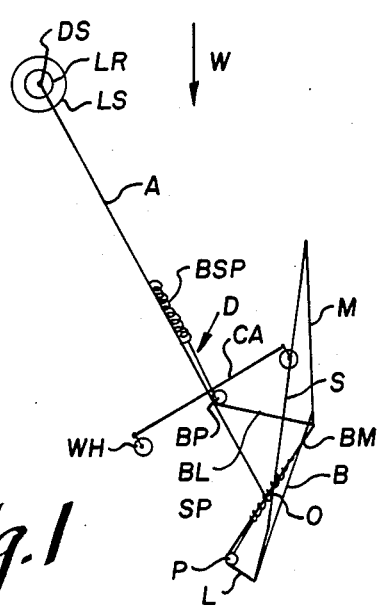
FIG. 1 is a schematic top plan view of a land-based sail-driven wind motor with the mast and sail shown in perspective in order to clarify the illustrated structure for the interested reader, the sail being shown as if it were transparent, in order to avoid obscuring structure which is beyond it.

In the several embodiments, modifications and elaborations which are depicted in the drawing figures, like characters are used for designating like structure, and repeated description is thereby rendered unnecessary. In the drawings, conventional components whose functions and characteristics are well-known are represented by approximate external shapes. Conventional connections whose functions and characteristics are well-known, between two or more conventional components whose functions and characteristics are well-known, are represented by dots. Design options are to be determined by strength of material and economic considerations. Relative sizes of the structural components are also not specifically shown in the drawings, these being design options.

In the following description, the acronym "SDWM" is sometimes used, in place of the term "sail-driven wind motor".

The simplest SDWM will be described first, with one arm, one cross-arm, one beam, one mast, and one sail, for a land site. FIGS. 1–12 variations are described. Then a double-ended SDWM for a land site will be described, with two arms, two cross-arms per arm, two beams per arm, and two masts and sails per beam (FIG. 16). Then a load support required for a shallow water site (FIGS. 17–20) will be described. Then a load support required for a deep water site (FIG. 21) will be described. Finally, a variation applicable to FIGS. 17–21 is described (FIGS. 22–24).

Figure 2:
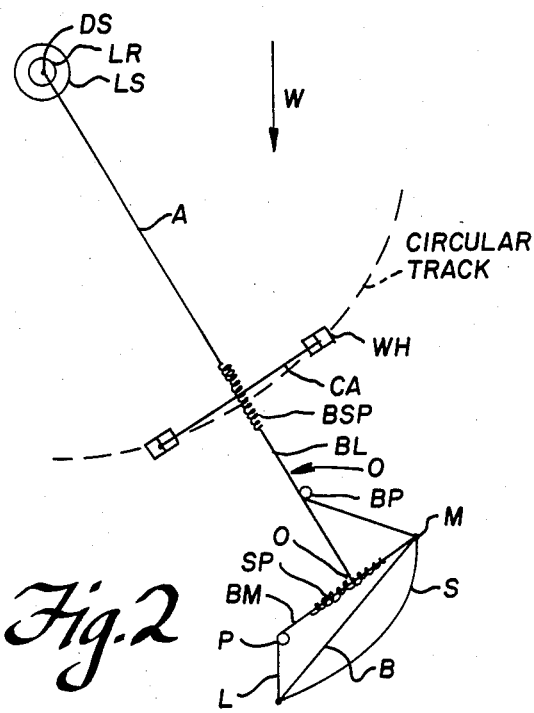
FIG. 2 is a schematic top plan view of the device of FIG. 1, with the mast and sail also being shown in plan, so that the mast appears as a point.
Figure 3:
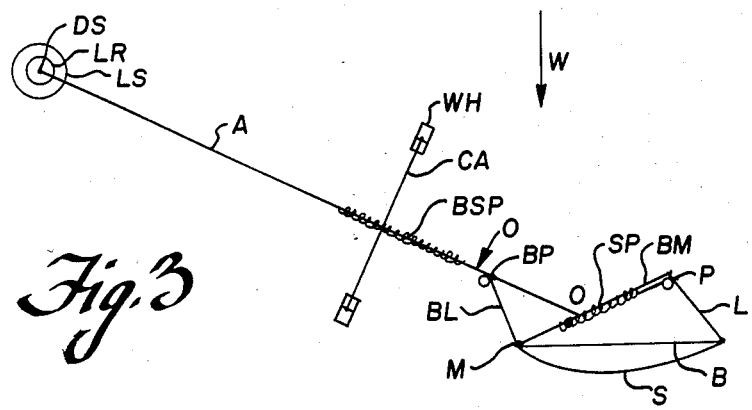
FIG. 3 is a schematic top plan view similar to FIG. 2 but showing the disposition of the structure immediately after the wind has shifted the sail to the other tack.
Figure 4:
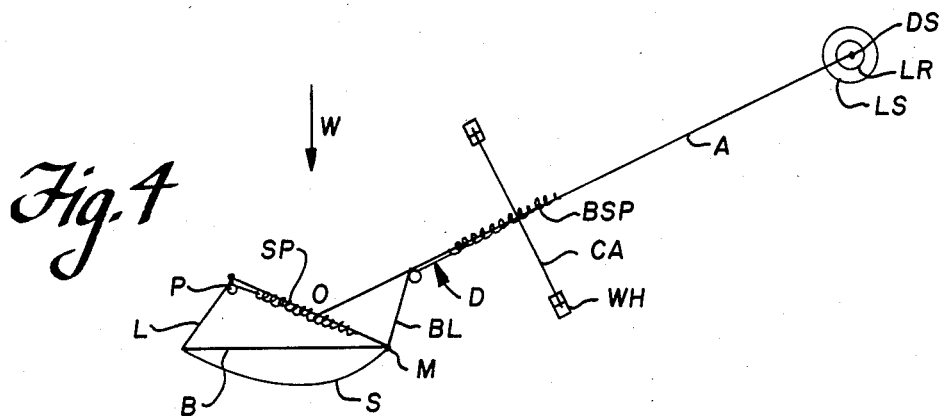
FIG. 4 is a schematic top plan view similar to FIG. 2 but at a stage subsequent to FIG. 3, showing the disposition of the structure immediately after the wind has shifted the sail back to the original tack, i.e. the one that pertains to FIG. 2.

A schematic perspective view of the first embodiment is shown in FIG. 1, and a top plan view of it is shown in FIG. 2. FIGS. 3 and 4 show, in top plan view, other positions of the apparatus of FIGS. 1 and 2 at other stages in the cycle of operation.

In order to help the reader to understand the following discussion, the structure depicted in these figures will now be described in somewhat more detail. The structure at the upper end of FIGS. 1–4 can be thought of as the hub of a wheel on an axle. LS and LR are, respectively, the stator and rotor of a load. The rotor is mounted for rotation relative to the stator about the axis of the drive shaft DS. The drive shaft DS is connected to the load rotor and the radially inner end of the arm A is connected to the drive shaft DS via a flexible drive FD (FIG. 11). The purpose of the structure shown at the lower end in FIGS. 1–4 is to reversibly rotate the arm A clockwise and counter-clockwise about the generally vertical axis of the drive shaft DS and thereby to rotate the load rotor. The intermittent reversing rotary motion of load LD could:

a. Drive a three-phase AC generator, the output of which could be rectified (and filtered if necessary) to drive a DC load, such as a rechargeable battery.
b. Be converted to intermittent rectilinear simple harmonic motion by a piston rod, to drive a piston-driven pump or compressor (land site).
c. Be converted to intermittent unidirectional rotary motion by use of a ratchet mechanism, to drive a load requiring such motion (any site), such as a pump or compressor.

In the land-based embodiments of FIGS. 1–16, the arm A is supported from the ground, remotely of the load, by wheels WH which are rollably mounted on the lower ends of vertically extending arm supports AS which, in turn have their upper ends mounted to the opposite (i.e. reversibly leading and trailing) ends of a cross-arm CA which is mounted to the arm A so as to extend generally horizontally-transversally (tangentially). The wheels WH may be constrained to roll on a circular (or part-circular) track TR provided on the ground and centered on the generally vertical axis of the drive shaft DS.

At the radially outer end of the arm A, a beam BM is shown pivotally mounted to the arm at pivot point O intermediate the ends of the beam BM, for pivoting about a generally vertical axis. The radius of arm A from load LD to cross-arm CA need not be equal to the radius of arm A from load LD to pivot point O for beam BM. Both radii are design options. Mast M is mounted on beam BM to extend vertically upwards therefrom, and supports a conventional fore-and-aft rig sail S (shown transparent in FIG. 1). Mast M is located on beam BM such that the center of pressure c.p. of sail S is located approximately directly over pivot point O when the wind W engages sail S. Mast M is mounted near the end of beam BM that is constrained to remain upwind of pivot point O.

A control mechanism is provided which constrains sail S to sail back and forth across wind W, forcing arm A to rotate about load LD, which transmits energy extracted from wind W to load LD. Mast M supports sail S and boom B. (Crossbeams and stays (not shown) may be needed in some designs to support mast M.) Line L is led from the end of boom B through pulley P to spring SP, which is mounted on beam BM (see FIG. 5). Beam line BL is led through beam pulley BP to beam spring BSP, which is mounted on arm A (see FIG. 1).

When wind W engages sail S, spring SP applies tension on line L, holding boom B in position to cause sail S to sail crosswind, which transmits energy extracted from wind W to load LD by rotating arm A about load LD. As arm A approaches a position nearly perpendicular to wind W, sail S slackens. The tension applied by beam spring BSP on beam line BL then moves the windward end of beam BM across wind W, which shifts sail S to the other tack. Sail S then drives arm A in the opposite direction across wind W and the cycle repeats. FIG. 3 shows the apparatus of FIG. 1 just after the wind has shifted the sail to the other tack. FIG. 4 shows the apparatus of FIG. 1 just after the wind has shifted the sail back to its original tack.

From start-up (from a no-wind condition, or from release of a disabling mechanism after excessive wind subsides), any small imbalance in moment of drag of sail S (or moments of drag of sails S) about pivot point O initiates operation of the SDWM by causing beam BM to increase the angle between beam BM and arm A.

There is a definite datum or 'no wind' orientation of the apparatus. It stops at whatever point in the cycle the wind velocity decreases to a threshold value, below which operation of the apparatus does not occur. In this condition, spring SP applies sufficient tension on line L to return boom B to a position parallel to beam BM, and beam spring BSP applies sufficient tension on beam line BL to return beam BM to a position parallel to arm A. Spring SP and beam spring BSP must supply sufficient tension to lines L and BL, respectively, in the 'no wind' condition to prevent slack, which could cause the lines to foul the pulleys. The center of pressure (c.p.) of sail S must be upwind of pivot point O, to ensure that a sufficient moment of sail drag about pivot point O tending to increase the angle between beam BM and arm A exists to initiate operation from a 'no wind' condition. The offset of the c.p. of sail S upwind of pivot point O (dimension c in FIG. 5) is a design option, requiring increased costs for beam spring BSP with increasing values of c. Any wind exceeding the threshold velocity would cause an angular disposition of beam BM relative to arm A about pivot point O which increases with wind velocity, up to some angle limited by stretching of beam spring BSP. Similarly, any wind velocity exceeding the threshold velocity would cause an angular disposition of boom B relative to beam BM about mast M which increases with wind velocity, up to some angle limited by stretching of spring SP.

Spring-driven windup reels WR or beam windup reels BWR could be used in lieu of coil spings SP and BSP, as shown in FIGS. 6 and 7, but would probably be more expensive in most instances. Windup reel WR shown in FIGS. 6 and 7 replaces spring SP, and a similar beam windup reel BWR would replace beam spring BSP. An optional auxiliary control mechanism is shown in FIGS. 8-10 for preventing the above-described sailing operation during periods of excessive wind velocity.

The arrow at point D in FIGS. 1-4 indicates the position of this optional control mechanism for disabling operation of the SDWM during periods of high wind. There are likely to be several different but equally useful such optional control mechanisms which could serve to perform this function, either all-mechanical, or hybrid electrical and mechanical. In the exemplary mechanism shown in FIGS. 8-10 beam spring BSP, beam pulley BP, and beam line BL operate as described above. Cam CM is biased by weight WT bearing against cam frame CF and/or cam spring CSP to keep the space between cam CM and anvil ANV open during low wind conditions. Wind W engages vane V attached to cam CM and rotates cam CM counter-clockwise about shaft SH, against the resistance of weight WT and/or cam spring CSP, with increasing radii of cam CM reducing the space between cam CM and anvil ANV through which beam line BL passes. As cam CM rotates counter-clockwise about shaft SH, longer radii of cam CM (caused by higher wind velocity) pinch beam line BL against anvil ANV, causing unidirectional motion of beam line BL. Beam spring BSP can still take-in beam line BL, but beam line BL is prevented from being drawn-out. Beam BM remains parallel to arm A, with sail S trailing downwind from mast M. As the wind velocity decreases, cam spring CSP rotates cam CM clockwise about shaft SH, and shorter radii of cam CM decrease the pressure of cam CM against beam line BL, until beam line BL moves freely through the space between cam CM and anvil ANV.

In FIG. 11, a first design is shown of a mechanism for transferring the sail drag to ground, while transferring the sail lift torque to load LD. The upwind end of arm A is supported on arm support AS riding on wheel(s) WH near load LD. The upwind end of arm A is connected to drive shaft DS of load rotor LR by a flexible drive FD, which may be similar to a plumber's "snake". A bearing mechanism surrounds drive shaft DS, consisting of rotating bearing ring housing RB riding inside of fixed bearing ring housing FB. The bearings between FB and RB may be either ball- or roller-type, and tilted if required to minimize wear. The bearing unit must be sealed as well as possible to keep out water (especially salt water—this mechanism may also be used for the shallow and deep water sites which are disclosed with regard to FIGS. 17-24). Stay STA connects one point on rotating bearing ring housing RB to arm A. Sail drag from arm A is applied through stay STA under tension to rotating bearing ring housing RB, to fixed bearing ring housing FB, to load stator LS, and to ground. Radii of the bearing mechanism housings RB and FB are determined by structural and economic criteria.

In FIG. 12, an alternative mechanism is shown for connecting arm A to load rotor LR suitable for a land site. Rotating bearing ring housing RB houses an inclined roller bearing rotating in fixed bearing ring housing FB. RB is fixed to rigid drive shaft DS of load rotor LR. This mechanism transfers the static load of the upwind end of arm A to ground via load stator LS, transfers the sail drag load from arm A to ground via load stator LS, and transfers the sail torque from arm A to load rotor LR.

A strong coil spring may serve as the flexible drive FD of FIG. 11 and still be sufficiently rigid to serve as the rigid drive shaft DS of FIG. 12. If so, then the mechanism of FIG. 11 may be replaced by the mechanism of FIG. 12, for all three types of sites, or at least the land and shallow water sites. If neither mechanism described above in relation to FIGS. 11 and 12 for transferring sail drag to ground is used or is insufficient, then circular track TR (FIG. 11) similar to a railroad track is required, with wheels WH being equipped with flanges at least on the upwind side.

FIGS. 13 and 14 show an apparatus which is similar to the one which has been described above with reference to FIGS. 1-12, except for having two masts M, each with a sail S, mounted on the same beam BM. In this variation, the center of pressure c.p. of the upwind sail S must be further from pivot point O than the c.p. of the downward sail S (i.e. in FIG. 14, $c_u$ must be greater than $c_d$). The net offset of the c.p. of sails S upwind of pivot point O ($c_u - c_d$) is a design option, requiring increased costs for beam spring BSP for increasing values of ($c_u - c_d$). For the configuration with two masts M per beam BM, masts M are located on beam BM such that moments of drag of sails S about pivot point O approximately balance when wind W engages sails S. One mast M is mounted near the end of beam BM that is constrained to remain upwind of pivot point O. The other mast M is mounted on the other end of beam BM, nearer to pivot point O than the upwind mast M. Since drag moments of sails S about pivot point O approximately balance, a much smaller and less costly control mechanism for positioning beam BM (i.e. beam line BL, beam pulley BP, and beam spring BSP) is required, compared to what is required for the configuration with a single, unbalanced sail S. Moments of lift of sails S about load LD are additive.

As the apparatus shown in FIG. 13 (or FIGS. 1-4) approaches the maximum excursion on a tack, the length that beam line BL extends can be greater than the length that beam spring BSP extends. This may be provided for by using two multi-pulley blocks, as shown in FIG. 15. Beam pulley BP1 is attached to the end of beam spring BSP, and beam pulley BP2 is attached to arm A. Beam pulley BP3 serves the same function as beam pulley BP in FIGS. 13 and 1-4, allowing the disabling mechanism of FIG. 10 to be positioned at point D. Alternatively, a beam windup reel BWR could be used in lieu of beam spring BSP, e.g. as disclosed above with respect to FIGS. 6 and 7.

In FIG. 16, a double-ended SDWM is shown, one which is similar in all respects to the embodiment which has been described above with respect to FIGS. 13 and 14, except that the arm A extends in two portions in both radially opposite directions from the drive shaft DS or flexible drive FD and is provided with two radially spaced cross-arms CA per arm portion, each cross-arm CA pivotally mounted beam B which, in turn, mounts two masts M having respective sails (like sails S, but not illustrated to avoid clutter). Any of the features which have been described above with reference to any of FIGS. 1-14 may be used with this embodiment also.

A probably worst case start-up situation from a 'no wind' condition for a double-ended SDWM would be wind from a direction perpendicular to arm A. In that case, any imbalance of sail drag moments about load LD would cause the apparatus to rotate about load LD. To ensure that this rotation results in beam springs BSP being upwind of beams BM, sails S on the downwind arm A could be designed to be larger than sails S on the upwind arm A. For the start-up situation with wind parallel to arm A and from the direction normally downward from load LD, sails may initially assume either tack. As the apparatus rotates about load LD some of the sails S will jibe, creating a larger than normal dynamic load on those sails, which must be planned for in the design.

In FIG. 17, a load support for a shallow water site is shown. Load stator LS rests on structure STR, which rests on the bottom. Arm A is connected to load rotor LR via flexible drive FD, and to rotating bearing ring housing RB via stay STA, as in FIG. 11. A double-ended float F is required for each cross-arm CA, one of which must be near the connection of stay STA to arm A for a single-ended SDWM, to support the upwind end of arm A. FIG. 18 shows a means for connecting float F to arm A and cross-arm CA, using float stays STF and pin PN, FIGS. 18-20. The remainder of the structure of this embodiment may be as has been described above with reference to FIGS. 1-12, 13-14, 15 or 16.

In FIG. 21, a load support for a deep water site is shown. Arm A is connected to load rotor LR via flexible drive FD, and to rotating bearing ring housing RB via stay STA, as in FIG. 11. Load stator LS is mounted in buoy BU, which is moored to ground by at least two anchor cables ANC. Arm A is supported by at least one cross-arm CA and float F per arm A, as in FIGS. 18-20. The shape of buoy BU is a design option, but a triangular buoy BU is shown, which should decrease rotation of buoy BU. Three anchor cables ANC are shown in FIG. 21. Buoy BU may also be fitted with underwater vertical vanes UV to decrease rotation. The mechanism for transferring sail drag load to buoy BU and sail lift torque to load rotor LR must operate under conditions of maximum motion of buoy BU due to wave action. Load LD is fixed in buoy BU with a waterproof cover and a water-tight drive shaft DS. Since anchor cables ANC and optional underwater vanes UV prevent rotation of buoy BU, a load output cable (not shown) from load LD to load output destination may then be direct, with no slip ring mechanism required on the bottom. In other respects, the embodiment shown in FIG. 21 may be as has been described above in regard to any of FIGS. 1-20.

FIGS. 22-24 show an apparatus similar to FIG. 1, using a boat hull and a double-ended float. In lieu of beam BM, mast M, and sail S in FIG. 1, the bow of a conventional fore-and-aft-rigged sailboat SB could be connected to the downwind end of arm A by a flexible connection FC such as a chain, as shown in FIGS. 22-24. When boom B is connected to tiller T by a line L and pulley P arrangement, such that tiller T is drawn upwind, forcing rudder R dowwind, as sail S is pushed downward by the wind, sailboat SB will sail back and forth across the wind, changing tack as the maximum excursion is reached at either end of the cycle. The mechanism shown in FIGS. 8-10 could be used to disable operation of the sailboat during high wind, by applying the beam line BL, beam pulley BP, and beam spring BSP combination in FIG. 1 to the forward end of tiller T, as shown in FIG. 24.

(Of course, the land-based embodiments described above will be provided with arm support means appropriate for supporting the arm or arms from the ground, e.g. arm supports, wheels and tracks, whereas the water-based embodiments will be provided with arm support means appropriate for supporting the arm or arms on water, e.g. double-ended floats).

At least the following configurations are possible for each of the three types of sites:

| Number of Arms | Number of Cross-arms/arm | Number of Beams/Arm | Number of Masts/beam |
|---|---|---|---|
| 1 | 1 | 1 | 1 |
| 1 | 1 | 1 | >1 |
| 1 | 1 | >1 | 1 |
| 1 | 1 | >1 | >1 |
| 1 | >1 | 1 | 1 |
| 1 | >1 | 1 | >1 |
| 1 | >1 | >1 | 1 |
| 1 | >1 | >1 | >1 |
| 2 | 1 | 1 | 1 |
| 2 | 1 | 1 | >1 |
| 2 | 1 | >1 | 1 |
| 2 | 1 | >1 | >1 |
| 2 | >1 | 1 | 1 |
| 2 | >1 | 1 | >1 |
| 2 | >1 | >1 | 1 |
| 2 | >1 | >1 | >1 |

An economic analysis will probably show that a configuration with two arms is more economically feasible (lower cost per unit of power produced) than the similar configuration with one arm, and that increasing the number of sails per arm increase the economic feasibility.

It should now be apparent that the sail-driven wind motor as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A sail-driven wind motor, comprising:
   a stator adapted to be supported on a foundation, a rotor associated with said stator and journalled for rotation with respect thereto, a rotary drive means operatively associated with said rotor for imparting rotary motion to said rotor upon rotation thereof, and an arm means operatively connected at a point thereon with said rotary drive means in cranking relation thereto so that as said arm means is reversingly rotated in a generally horizontal plane about said point said rotary drive means is correspondingly reversingly rotated, said arm means having at least one portion which extends radially outwardly from said point, each such arm portion having a radially outer end located distally of said point;
   at least one sail assembly including at least one sail fore and aft rigged to a respective subassembly of an erect mast and generally horizontal beam;
   means mounting each said mast and beam subassembly to a respective said arm portion, distally of said point, for rotation about a generally vertical axis, with each beam being disposed athwart the respective arm portion; and rigging means operatively associated between each said mast and beam subassembly and the respective said arm for automatically reversingly, oscillatingly tacking said sail with respect to a wind heading direction upon clockwise and counter-clockwise extremes of rotation of said arm means caused by wind-induced lift on said at least one sail and thereby reversingly rotating the respective said arm throughout a circular arc of less than 360.

2. The sail-driven wind motor of claim 1, further including:

wind velocity-responsive means operatively associated with said rigging means for automatically at least temporarily disabling said rigging means from tacking said sail in at least one said direction at times when wind velocity to which said at least one sail is subject exceeds a predetermined wind velocity.

3. The sail-driven wind motor of claim 1, wherein:
said rotor and stator are vertically oriented, as is said rotary drive means, and said sail-driven wind motor further includes means for transmitting wind-caused drag on said sail means to said foundation.

4. The sail-driven wind motor of claim 3, wherein:
said drag-transmitting means comprises bearing means on said stator operatively associated with bearing means on said rotor.

5. The sail-driven wind motor of claim 3, wherein:
said drag-transmitting means comprises a track means adapted to be mounted on said foundation so as to extend at least part-circularly about said point, and respective wheel means operatively mounted to each said arm portion distally of said point and associated with track for circularly arcuate travel thereabout, said wheel means and said track means being provided with cooperating surface means for preventing substantial travel of said wheel means towards and away from said point.

6. The sail-driven wind motor of claim 1, wherein:
said arm means is constituted by at least two arm portions extending in radially opposite directions relative to said point.

7. The sail-driven wind motor of claim 1, further including:

support means engaging each said arm portion distally of said point and being adapted to support the respective said arm portion from said foundation.

8. The sail-driven wind motor of claim 7, adapted for use in an instance in which said foundation is subaquatic, by said support means comprising at least one double-ended float mounted to the respective arm portion and extending crosswise thereof.

9. The sail-driven wind motor of claim 7, wherein:
said support means comprises wheel means rollably mounted to the respective arm portion for rolling engagement with said foundation providing that said foundation is exposed and generally horizontal.

10. The sail-driven wind motor of claim 1, adapted for use in an instance in which said foundation is subaquatic, by each said mounting means comprising a boat hull tethered by the bow thereof to the respective said arm portion; said boat hull having a rudder operated by a tiller; and said tiller being operatively connected with said rigging means, whereby said tiller is automatically oscillated for tacking the respective said sail.

11. The sail-driven wind motor of claim 3, adapted for use in an instance in which said foundation is subaquatic, by further including a tower structure adapted to be supported on said foundation and to support said stator with said drive shaft means operatively connected to said arm means out of and above water.

12. The sail-driven wind motor of claim 11, wherein:
said tower structure is a bottom-anchored, floating tower structure provided with means for inhibiting rotation thereof.

13. The sail-driven wind motor of claim 1, wherein:
each said sail assembly includes a pair of sails which are spaced laterally of one another, such sails of such sail assembly sharing in common said beam.

* * * * *